CONSTANT VOLTAGE REGULATOR DEPENDENT ON RESISTOR RATIOS

Filed Nov. 9, 1966

INVENTOR
LEANDER H. HOKE, JR.
BY Leonard Zalman
ATTORNEY

1

3,416,067
CONSTANT VOLTAGE REGULATOR DEPENDENT ON RESISTOR RATIOS

Leander H. Hoke, Jr., Southampton, Pa., assignor to Philco-Ford Corporation, Philadelphia, Pa., a corporation of Delaware Filed Nov. 9, 1966, Ser. No. 593,122
5 Claims. (Cl. 323—17)

This invention relates to an electronic regulator circuit and more particularly to a novel semiconductor amplifier circuit especially suitable for use as a voltage regulator circuit.

Conventional voltage regulator circuits contain a voltage reference device and usually compare a fraction of the potential at the output terminal of the circuit with a reference potential supplied by the voltage reference device. The voltage reference device is usually a Zener diode, a glow tube, or a battery. Although glow tubes and batteries may be suitable for use in conventional voltage regulator circuits, they are obviously unacceptable for use with integrated semiconductor circuits.

It has been found that the Zener breakdown voltage of a diode depends upon the pattern of the concentrations of impurities in the proximity of the p-n junction. Since it is very difficult to determine or control the pattern of impurity concentration in the proximity of a p-n junction in an integrated semiconductor circuit it is difficult to manufacture Zener diodes having preselected characteristics as part of an integrated circuit. Therefore, Zener diodes are not suitable voltage references in integrated semiconductor circuits.

Zener diodes are also undesirable as components of integrated semiconductor circuits because the Zener potential of the diodes is functionally related to temperature. A rise in temperature of a Zener diode is accompanied by a rise in the Zener breakdown potential of the diode. It is very difficult to compensate for this temperature variation because the relationship between the Zener potential of a diode and the temperature of the diode is a nonlinear function.

It is therefore an object of the present invention to provide an improved voltage regulator circuit.

Another object is to provide a voltage regulator circuit which does not require a voltage reference device.

Another object is to provide a voltage regulator circuit that can be fabricated as a single integrated circuit.

An additional object is to provide a circuit in which the output voltage can be caused to increase, decrease or remain constant in amplitude with changes in input or supply voltage.

According to the present invention the voltage regulator circuit comprises only resistors and transistors. The output voltage of the circuit is maintained at a constant amplitude independent of the value of the input voltage by proper choice of the ratio of values of the resistors of the circuit.

In a specific embodiment of the present invention the circuit comprises first and second supply terminals to which a voltage is supplied, first and second amplifier circuits connected across the supply terminals, a voltage divider connecting a terminal of the first amplifier circuit to the second supply terminal, and first and second load impedances connecting first and second terminals of the second amplifier circuit to the first and second supply terminals. A control terminal of the first amplifier circuit is connected to the first terminal of the second amplifier circuit and a control terminal of the second amplifier circuit is connected to a tap on the voltage divider and to the first supply terminal.

2

The above objects and other objects inherent to the present invention will be more clearly understood when reference is had to the accompanying drawing, in which.

Figures 1, 2:
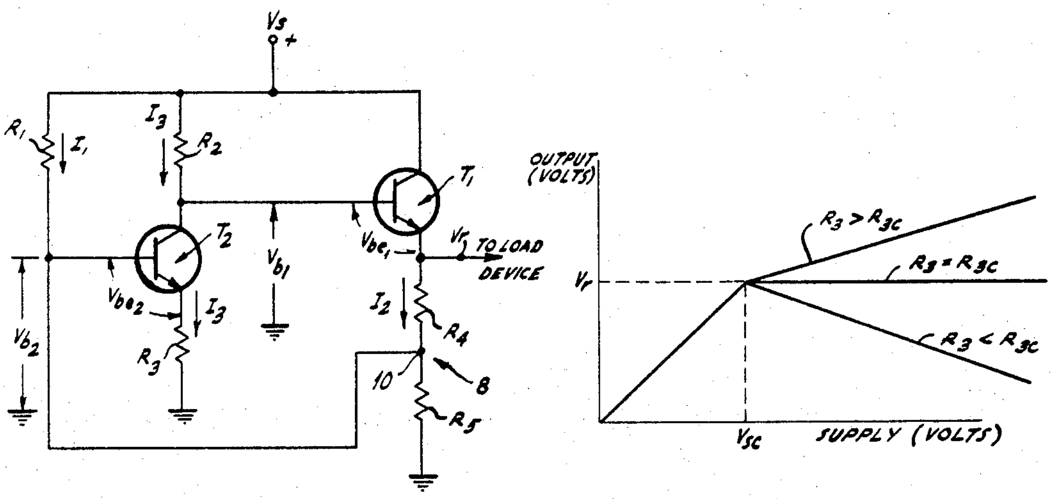
FIG. 1 is a schematic diagram of the circuit of the present invention.
FIG. 2 is a graph showing the transfer characteristics of the circuit of FIG. 1.

Referring to FIG. 1, the positive terminal of a direct-current voltage source $V_s$ is connected to the collector or output electrode of a first transistor $T_1$, through a resistor $R_1$ to the base or control electrode of a second transistor $T_2$, and through a resistor $R_2$ to the collector or output electrode of said second transistor $T_2$. By way of example, the transistors $T_1$ and $T_2$ are shown to be of the N–P–N type although the circuit can be readily modified to employ transistors of the P–N–P type. The base electrode of the first transistor $T_1$ is connected to the collector electrode of the second transistor $T_2$ and through said resistor $R_2$ to the direct-current voltage source $V_s$. The emitter electrode of the first transistor $T_1$ is connected through a voltage divider network 8 which comprises serially conected resistors $R_4$ and $R_5$ to a point of reference potential, for example, ground. The junction point 10 of the resistors $R_4$ and $R_5$ is connected to the base electrode of the transistor $T_2$. The emitter or common electrode of the second transistor $T_2$ is connected through a resistor $R_3$ to the point of reference potential. The regulated output voltage $V_r$ appears across the voltage divider network 8, which may be connected in parallel with any load device (not shown) that requires a constant amplitude supply voltage.

In accordance with the present invention, I have discovered that proper selection of the value of the resistor $R_3$ will make the output voltage $V_r$ independent of the amplitude of the supply voltage $V_s$ for amplitudes of the supply voltage greater than a minimum value. It is to be noted that the regulated output voltage $V_r$ is achieved without the incorporation of a voltage reference device in the circuit.

Referring now to FIG. 2, there is shown a graph of the transfer characteristics of the circuit of FIG. 1 for different values of the resistor $R_3$. It can be seen that for a critical value $R_{3c}$ of the resistor $R_3$ the output voltage $V_r$ remains constant for a large range of amplitudes of the supply voltage $V_s$ greater than a minimum value $V_{sc}$. For values of the resistor $R_3$ above and below the critical value $R_{3c}$, the value of the output voltage $V_r$ increases or decreases when the amplitude of the supply voltage changes.

Referring again to FIG. 1, the equation for computing the critical value $R_{3c}$ of the resistor $R_3$ may be derived as follows. For the purpose of this derivation, it is assumed that the value of alpha for the transistors $T_1$ and $T_2$ is equal to unity, hence base current in the transistors $T_1$ and $T_2$ is considered negligible compared to collector and emitter currents in these transistors. It is also assumed that the internal resistances of transistors $T_1$ and $T_2$ are negligible.

Analysis of FIG. 1 shows that the independent variable $V_s$ and the dependent variable $V_r$ are equated to the branch currents $I_1$ and $I_2$ and to the resistances $R_1$, $R_2$, $R_4$ and $R_5$ according to the equations $$V_s=(R_1+R_5)I_1+R_5I_2 \quad (1)$$

and $$V_r=R_5I_1+(R_4+R_5)I_2 \quad (2)$$

Solving for the branch currents $I_1$ and $I_2$ yields $$I_1=\frac{V_s(R_4+R_4)-V_rR_5}{(R_1+R_5)(R_4+R_5)-R_5^2} \quad (3)$$

and $$I_2=\frac{V_r(R_1+R_5)-V_sR_5}{(R_1+R_5)(R_4+R_5)-R_5^2} \quad (4)$$

Noting also that $$V_{b_2}=(I_1+I_2)R_5=\left[\frac{V_sR_4+V_rR_1}{(R_1+R_5)(R_4+R_5)-R_5^2}\right]R_5 \quad (5)$$

$$I_3=\frac{V_{b_2}-V_{be_2}}{R_3} \quad (6)$$

$$V_{b1}=V_s-R_2I_3 \quad (7)$$

$$V_r=V_{b_1}-V_{be_1} \quad (8)$$

and substituting Equations 5, 6, and 7 into Equation 8, Equation 8 becomes $$V_r=V_s-\frac{R_2}{R_3}\left[\frac{(V_sR_4+V_rR_1)R_5}{(R_1+R_5)(R_4+R_5)-R_5^2}-V_{be_2}\right]-V_{be_1} \quad (9)$$

Equation 9 can be expanded to the form $$V_r=\frac{V_s\left[1-\frac{R_2}{R_3}\cdot\frac{R_4R_5}{(R_1+R_5)(R_4+R_5)-R_5^2}\right]+V_{be_2}\frac{R_2}{R_3}-V_{be_1}}{1+\frac{R_2}{R_3}\cdot\frac{R_1R_5}{(R_1+R_5)(R_4+R_5)-R_5^2}} \quad (9a)$$

If the factor which multiplies the supply voltage $V_s$ is set to equal zero, Equation 9*a* will yield a value for $V_r$ which is independent of the supply voltage $V_s$. Equating the factor which multiplies the supply voltage $V_s$ to zero yields $$1-\frac{R_2}{R_3}\cdot\frac{R_4R_5}{(R_1+R_5)(R_4+R_5)-R_5^2}=0 \quad (10)$$

and solving for $R_3$ yields $$R_3=\frac{R_2}{\frac{R_1}{R_5}+\frac{R_1}{R_4}+1} \quad (10a)$$

The value of $R_3$ which satisfies Equation 10*a*, heretofore referred to as $R_{3c}$, provides a voltage regulator circuit in which the output voltage $V_r$ is independent of the supply voltage $V_s$.

The value of the regulated output voltage $V_r$ when $R_3$ equals $R_{3c}$ is determined by noting the constraints on the resistance values given by Equation 10*a* and substituting these values into Equation 9*a*. This substitution yields $$V_r=\frac{\frac{R_2}{R_{3c}}\cdot V_{be_2}-V_{be_1}}{1+\frac{R_1}{R_4}} \quad (11)$$

If the transistors $T_1$ and $T_2$ are assumed to have matched base-emitter voltages $V_{be_1}$ and $V_{be_2}$, respectively, at their respective current levels, and these voltages are both referred to as $V_{be}$, a simplification of Equation 11 is possible and the simplification yields $$V_r=\frac{V_{be}\left(\frac{R_2}{R_{3c}}-1\right)}{1+\frac{R_1}{R_4}} \quad (12)$$

From the foregoing explanations and from an analysis of Equation 12, it is readily apparent that the circuit of the present invention will produce an output voltage $V_r$ which is independent of the magnitude of the supply voltage $V_s$. Furthermore, the form of the Equations 10*a* and 12 show that the regulation characteristics of the circuit are dependent upon resistor ratios rather than absolute values. Since resistance ratios are easily controlled in the manufacture of integrated circuits by controlling ratios of areas, the circuit of the present invention is ideal for use in integrated circuits.

Equations for the values of $R_3$ and $V_r$ for values of alpha other than unity and internal transistor resistances other than zero can be derived in a similar manner. However, this added precision results in an equation of considerable complexity. In practice, it is sufficient to select the approximately correct values of the circuit parameters in accordance with Equations 10*a* and 12 and then, if greater precision is required, determine experimentally the precise values required to give a constant output voltage of the desired value $V_r$.

The operation of the system of the present invention can also be explained as follows. If the supply voltage $V_s$ is either increased or decreased, this change tends to appear at the load and also across the voltage divider network 8 formed by the resistors $R_4$ and $R_5$. The change in voltage across the voltage divider network 8 is detected at the base of transistor $T_2$, thereby changing the collector current of transistor $T_2$, either increasing or decreasing this current. This changes the current through resistor $R_2$ and a change in the collector to base bias of the transistor $T_1$ results. The latter change adjusts the magnitude of the collector to emitter current flow of transistor $T_1$ to maintain a constant voltage $V_r$ across the load device (not shown).

A variable value of regulated voltage is achieved by replacing the resistors $R_4$ and $R_5$ by a potentiometer. When the wiper arm of the potentiometer is near the center of the potentiometer range and the value of resistor $R_3$ is in accordance with Equation 10*a*, the value of the output voltage $V_r$ can be varied over greater than a two to one range with small changes in the position of the wiper arm. The voltage variation is achieved with only a minor loss of regulation.

It is well known that the gain of the usual transistor amplifier stage changes with temperature. This is mainly due to the fact that the parameter $V_{be}$ changes with temperature. This variation in gain of the transistor stage can be offset by an appropriate change in the collector bias voltage. The voltage regulator circuit of the present invention produces an output voltage which is a direct function of the transistor parameter $V_{be}$ (Equation 12) and thereby offers the advantage of providing a collector supply voltage which changes automatically in the correct direction to compensate for any change in gain of a transistor stage connected thereto which undergoes the same temperature change as the regulator circuit.

In a specific embodiment of the present invention which has proven successful as a voltage regulator in a transistor radio receiver, the values of the resistors $R_1$, $R_2$, and $R_4$ were each 10,000 ohms and the initial supply voltage was a 6 volt battery. The value of resistor $R_5$ was 1,090 ohms and the value of resistor $R_{3c}$ was 725 ohms. The discrepancy in the value of the resistor $R_{3c}$ from the value ($\approx$900 ohms) computed using Equation 10*a* is due to the assumptions that the internal resistances of the transistors $T_1$ and $T_2$ are negligible and that the base currents of the transistors $T_1$ and $T_2$ are negligible compared to collector and emitter currents of these transistors. In this embodiment, the output voltage $V_r$ remained constant at 3 volts even though the supply voltage $V_s$ decreased due to discharging of the 6 volt battery.

Figures 3, 4:
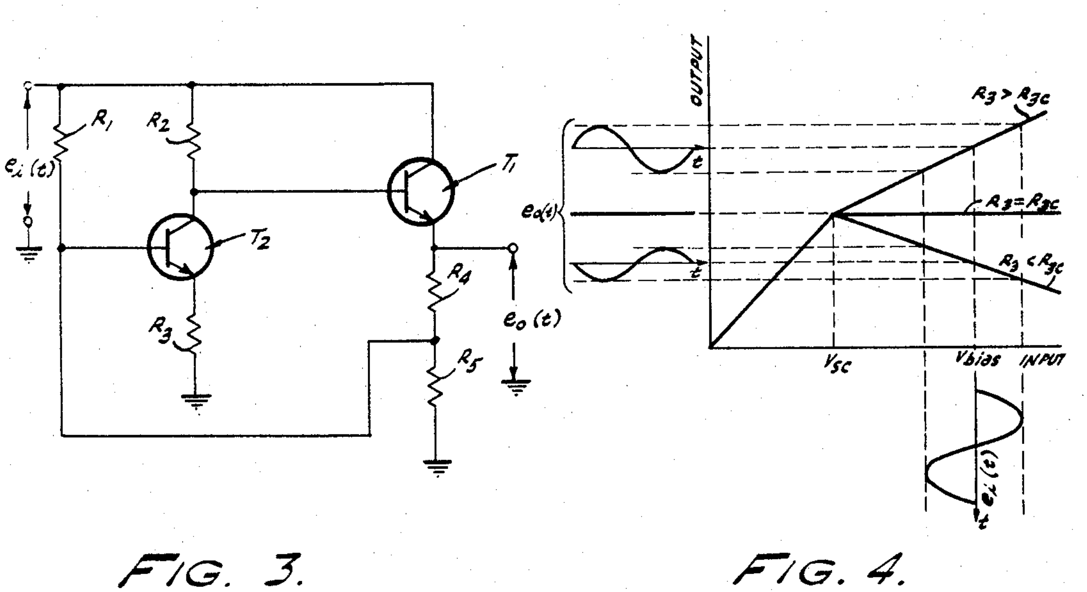
FIG. 3 is a schematic diagram of the circuit of the present invention used as a variable attenuation circuit.
FIG. 4 is a graph showing the transfer characteristics of the circuit of FIG. 3.

The system of the present invention is also useful as a variable attenuation circuit. Referring to FIG. 3, which shows the circuit of FIG. 1 redrawn with the input and output terminals designated $e_i(t)$ and $e_o(t)$, respectively, to denote the A.C. input and output signals of the circuit, respectively. FIG. 4, which is similar to FIG. 2, shows the transfer characteristics of the circuit of FIG. 3 and shows that the amplification of the input signal, $e_i(t)$, produced by the circuit of FIG. 3 is dependent upon the value of the resistor $R_3$.

If the value of the resistor $R_3$ is equal to $R_{3c}$, the circuit will remove AC signal variations of any signal having a DC bias $V_{bias}$ greater than the critical level $V_{sc}$ by the peak amplitude of the AC component and will produce a controlled DC output signal, thus, acting as a regulator. If the value of $R_3$ is greater than $R_{3c}$, an output signal having the same phase as that of the input signal will be produced, the amplitude of this signal being dependent on the difference between the value of $R_3$ and $R_{3c}$. Similarly if the value of $R_3$ is less than that of $R_{3c}$ the output signal will have an amplitude dependent on the difference between the value $R_3$ and that of $R_{3c}$. However, in this instance, the phase of the output signal will be opposite to that of the input signal. Due to the linearity of the transfer impedance of the circuit of FIG. 3, the circuit can control much larger signal levels than conventional transistor gain control circuits while introducing very little distortion.

While the invention has been described with reference to certain preferred embodiments thereof, it will be apparent that various modifications and other embodiments thereof will occur to those skilled in the art within the scope of the invention. Accordingly I desire the scope of my invention be limited only by the appended claims.

I claim:

1. A circuit comprising first and second supply terminals to which a voltage may be supplied; a first series circuit connected between said first and second supply terminals and comprising a first amplifier element having first and second terminals of a main current path and a control terminal for controlling current flowing in said main current path, and a voltage divider connecting said second terminal of said first amplifier element to said second supply terminal; a second series circuit connected between said first and second supply terminals and comprising a second amplifier element having first and second terminals of a main current path and a control terminal for controlling current flow in said main current path, and first and second load impedances connecting said first and second terminals, respectively, of said second amplifying element to said first and second supply terminals, respectively; means connecting said control terminal of said first amplifier element to said first terminal of said second amplifying element, means connecting said control terminal of said second amplifier element to an intermediate tap on said voltage divider, and means connecting said control terminal of said second amplifier element to said first supply terminal.

2. The circuit of claim 1 in which said last-mentioned means includes a resistor $R_1$, said first and second load impedances are resistors $R_2$ and $R_3$, respectively, and said voltage divider network comprises two resistors $R_4$ and $R_5$ connected in series.

3. The circuit of claim 2 in which said resistor $R_3$ has a value approximately equal to the value determined by the formula $$R_3=\frac{R_2}{\frac{R_1}{R_5}+\frac{R_1}{R_4}+1}$$

4. The circuit of claim 3 in which said first and second amplifier elements are transistors, in which said first, second, and control terminals are collector, emitter, and base electrodes, respectively.

5. A voltage regulated power supply circuit comprising only: a voltage source, a first transistor and first and second resistors connected in a first series circuit across said voltage source, a second transistor and third and fourth resistors connected in a second series circuit across said voltage source, a direct connection from the control electrode of said first transistor to an intermediate point on said second series circuit, a direct connection from the control electrode of said second transistor to an intermediate point on said first series circuit, and a fifth resistor connected between one of said control electrodes and one terminal of said voltage source.

References Cited

UNITED STATES PATENTS

| | | | |
|---|---|---|---|
| 2,991,407 | 7/1961 | Murphy | 323—4 |
| 3,141,135 | 7/1964 | Amlinger et al. | 307—303 X |
| 3,142,021 | 7/1964 | Stelmak | 307—303 X |
| 3,223,781 | 12/1965 | Hestad | 323—22 X |
| 3,246,233 | 4/1966 | Herz | 323—4 |
| 3,271,685 | 9/1966 | Husher et al. | 307—303 X |

LEE T. HIX, *Primary Examiner.*

A. D. PELLINEN, *Assistant Examiner.*

U.S. Cl. X.R.

307—303; 323—23